(12) United States Patent
Hidaka et al.

(10) Patent No.: US 7,654,559 B2
(45) Date of Patent: Feb. 2, 2010

(54) AIRBAG APPARATUS

(75) Inventors: Nobuyuki Hidaka, Wako (JP); Takeru Fukuda, Wako (JP); Tadashi Inazu, Wako (JP); Takashi Honda, Wako (JP); Tatsuhiko Nakamura, Fuji (JP); Kenichi Kamio, Fuji (JP)

(73) Assignees: Honda Motor Co., Ltd., Tokyo (JP); Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 12/237,366

(22) Filed: Sep. 24, 2008

(65) Prior Publication Data

US 2009/0079176 A1   Mar. 26, 2009

(30) Foreign Application Priority Data

Sep. 26, 2007   (JP) ............... 2007-249831

(51) Int. Cl.
*B60R 21/16* (2006.01)
(52) U.S. Cl. .................. 280/728.2; 280/730.2
(58) Field of Classification Search .............. 280/730.2, 280/728.3, 728.2
See application file for complete search history.

(56) References Cited

U.S. PATENT DOCUMENTS

| 6,103,984 | A * | 8/2000 | Bowers et al. | ............ | 280/730.2 |
| 6,234,517 | B1 * | 5/2001 | Miyahara et al. | ......... | 280/730.2 |
| 6,336,651 | B1 * | 1/2002 | Mramor et al. | ........... | 280/728.2 |
| 6,974,151 | B2 * | 12/2005 | Ochiai et al. | ............. | 280/728.2 |
| 2005/0173902 | A1 * | 8/2005 | Boxey | ...................... | 280/730.2 |
| 2007/0052220 | A1 * | 3/2007 | Hidaka | .................... | 280/730.2 |

FOREIGN PATENT DOCUMENTS

JP   11-321477   11/1999

* cited by examiner

*Primary Examiner*—Faye M. Fleming
(74) *Attorney, Agent, or Firm*—Darby & Darby P.C.

(57) ABSTRACT

An airbag apparatus equipped with an airbag, a garnish, a hinge, a protector and a bracket fixed to a vehicle body. An upper side of the garnish is supported by the bracket via the hinge. An engaging part protruding from the lower part of a garnish main part is engaged with an engagement receiving part disposed at the protector. Normally, the engaging part is engaged with the engagement receiving part, thereby retaining the shape of the garnish. On expansion of the airbag, the airbag presses the engaging part, by which the engaging part is disengaged from the engagement receiving part, and the garnish is opened smoothly. The airbag can be covered with the garnish, thereby allowing the garnish to move smoothly on expansion of the airbag.

6 Claims, 4 Drawing Sheets

AIRBAG APPARATUS

INCORPORATION BY REFERENCE

The present invention claims priority under 35 U.S.C. §119 to Japanese Patent Application No. 2007-249831 filed on Sep. 26, 2007. The content of the application is incorporated herein by reference in its entirety.

FIELD OF THE INVENTION

The present invention relates to an airbag apparatus which expands an airbag, for example, along window parts on the side of a cabin of a vehicle.

BACKGROUND OF THE INVENTION

Conventionally, regarding an airbag apparatus equipped with an airbag which is inflated and expanded upon injection of gas, known is a so-called curtain airbag apparatus which expands along window parts of the door on the side of a cabin of an automobile. An airbag used in this airbag apparatus is normally folded into a long-thin shape and disposed along the upper edge of the window part on the side of the cabin. Then, upon impact such as a side collision or rolling over, gas is supplied from an inflator, by which the airbag is expanded and further expanded downward along the window part or the like on the side of the cabin.

As the above-described airbag apparatus, there is known a constitution disclosed in Japanese Laid-Open Patent Publication No. 11-321477 in which a folded airbag is covered with a pillar garnish or an interior trim material of an automobile. The pillar garnish is formed of plastic, and is constituted so that it is elastically deformed on expansion of an airbag, so as not to impede the airbag from expanding. Further, stopper fitting, clips, bolts or the like are fitted on the back of the pillar garnish, and the stopper fitting is locked into a fitting lock hole, by which a pillar garnish is fitted to the vehicle body. Further, a trim part of the door weather strip fitted to a front pillar is used to fill a gap between the pillar garnish and the front pillar.

However, in a constitution in which the plastic-made pillar garnish or an interior trim material is elastically deformed, there is a problem that the plastic is softened to easily change the characteristics at an extremely high-temperature, for example, and a trim part of a door weather strip which is simply formed of rubber is difficult in supporting stably a long pillar garnish covering an airbag folded into a long-thin shape. There is also a problem that before the airbag apparatus is fitted to an automobile, no member is provided for supporting the external edge of the pillar garnish and the pillar garnish may be deformed during transport of the airbag apparatus.

As described above, for a conventional constitution in which a long airbag folded into a long-thin shape is covered with a cover body, a constitution that on expansion of an airbag, the airbag smoothly expands and is also able to keep a favorable appearance by suppressing the deformation of the cover body during normal times before the expansion or before installation to the body.

The present invention has been made in view of the above situation, and an object of which is to provide an airbag apparatus which is provided with a cover body for protecting an airbag and capable of retaining a favorable appearance of the cover body and smoothly opening the cover body on expansion of the airbag.

SUMMARY OF THE INVENTION

The airbag apparatus of the present invention includes an airbag which is inflated and expanded from a state of being folded into a long-thin shape upon introduction of gas, a supporting body fitted to a to-be-fitted member, a cover body equipped with a main part covering the airbag in a folded state along the longitudinal direction, a fitting part disposed on one side of the main part along the longitudinal direction and supported by the supporting body, and an engaging part disposed on the other side of the main part along the longitudinal direction, and an engagement receiving part disposed on the supporting body, engaged with the engaging part in a disengageable manner, supporting the main part via the engaging part at folded state of the airbag, and releasing the engagement of the engaging part on expansion of the airbag, thereby allowing for movement of the main part.

Then, according to the above constitution, during normal times when the airbag is folded into a long-thin shape, before or after the airbag apparatus is fitted to the to-be-fitted member, the fitting part disposed on one end of the main part along the longitudinal direction is supported by the supporting body and the engaging part disposed on the other side of the main part along the longitudinal direction is engaged with the engagement receiving part of the supporting body, by which the airbag is covered with the cover body so as to be favorable in appearance and stable. On expansion of the airbag, the airbag presses the cover body, thereby the engaging part is disengaged from the engagement receiving part, allowing for movement of the cover body, and allowing a smooth expansion of the airbag. Since the engagement receiving part is disposed on the supporting body, the airbag apparatus is available as a module, and the cover body is supported even before the airbag apparatus is fitted to the to-be-fitted member.

Further, in the airbag apparatus according to the present invention, a supporting body is equipped with a bracket fitted to the to-be-fitted member, a protector equipped with a guide part fitted to the bracket and disposed along the longitudinal direction of the airbag in a folded state and the engagement receiving part.

Then, in the above constitution, the airbag is protected by the guide part of a protector during normal times when the airbag is folded into a long-thin shape and also on expansion. Since the engagement receiving part is disposed on the protector, the airbag apparatus is made simplified in constitution, thereby reducing the production cost.

Further, in the airbag apparatus of the present invention, an engaging part is equipped with an airbag receiving part pressed by an airbag on inflation and expansion of the airbag.

Then, in the above constitution, since the airbag receiving part is equipped, the engaging part reliably receives a force by which the airbag is inflated and expanded, and the engaging part can be smoothly and quickly disengaged from the engagement receiving part on inflation and expansion of the airbag.

Further, the airbag apparatus of the present invention is constituted in such a manner that the cover body is an interior trim material of a vehicle, the bracket is located on the side part of a cabin and fixed to the vehicle body, and the airbag expands along the side of the cabin.

Then, in the above constitution, since the airbag folded into a long-thin shape is equipped and the cover body covering the airbag is given as an interior trim material of a vehicle, it is possible to provide a constitution suitable as an airbag apparatus for the side part of a cabin.

As described above, according to the airbag apparatus of the present invention, during normal times when the airbag is folded into a long-thin shape, before or after the airbag apparatus is fitted to the to-be-fitted member, a fitting part disposed on one side along the longitudinal direction of the main part is supported by the supporting body and an engaging part disposed on the other side of the main part along the longitudinal direction is engaged with the engagement receiving part of the supporting body, by which the airbag can be covered with the cover body so as to be favorable in appearance and stable. On expansion of an airbag, the airbag presses the cover body, thereby the engaging part is disengaged from the engagement receiving part, allowing for movement of the cover body, and allowing for a smooth expansion of the airbag. Since the engagement receiving part is disposed on the supporting body, the airbag apparatus is available as a module, and the cover body can be supported even before the airbag apparatus is fitted to the to-be-fitted member.

DETAILED DESCRIPTION OF THE INVENTION

Hereinafter, a description will be given of an embodiment of the airbag apparatus of the present invention with reference to the drawings.

Figure 1:
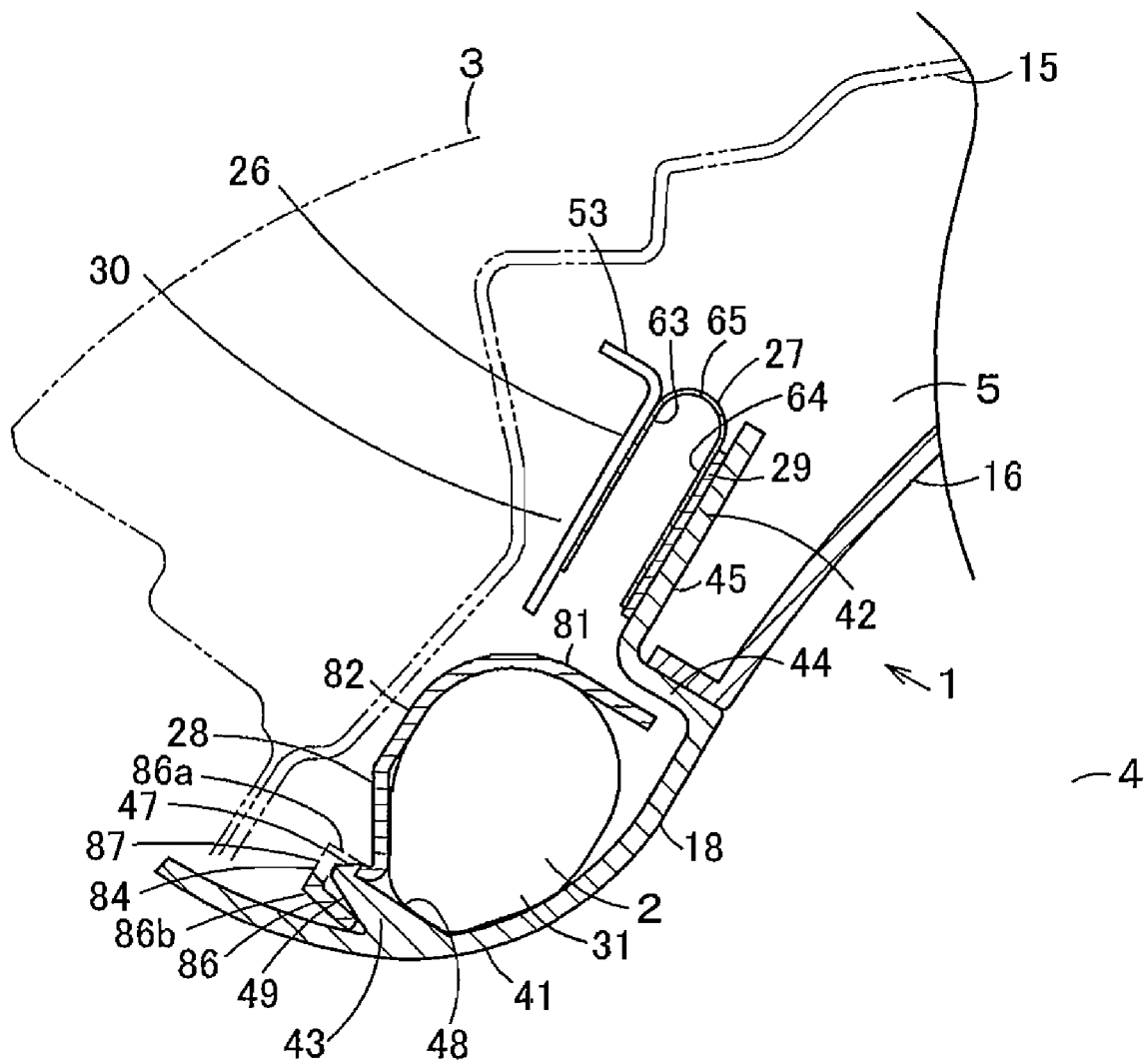
FIG. 1 is a sectional view showing one embodiment of the airbag apparatus of the present invention during normal times.
Figure 2:
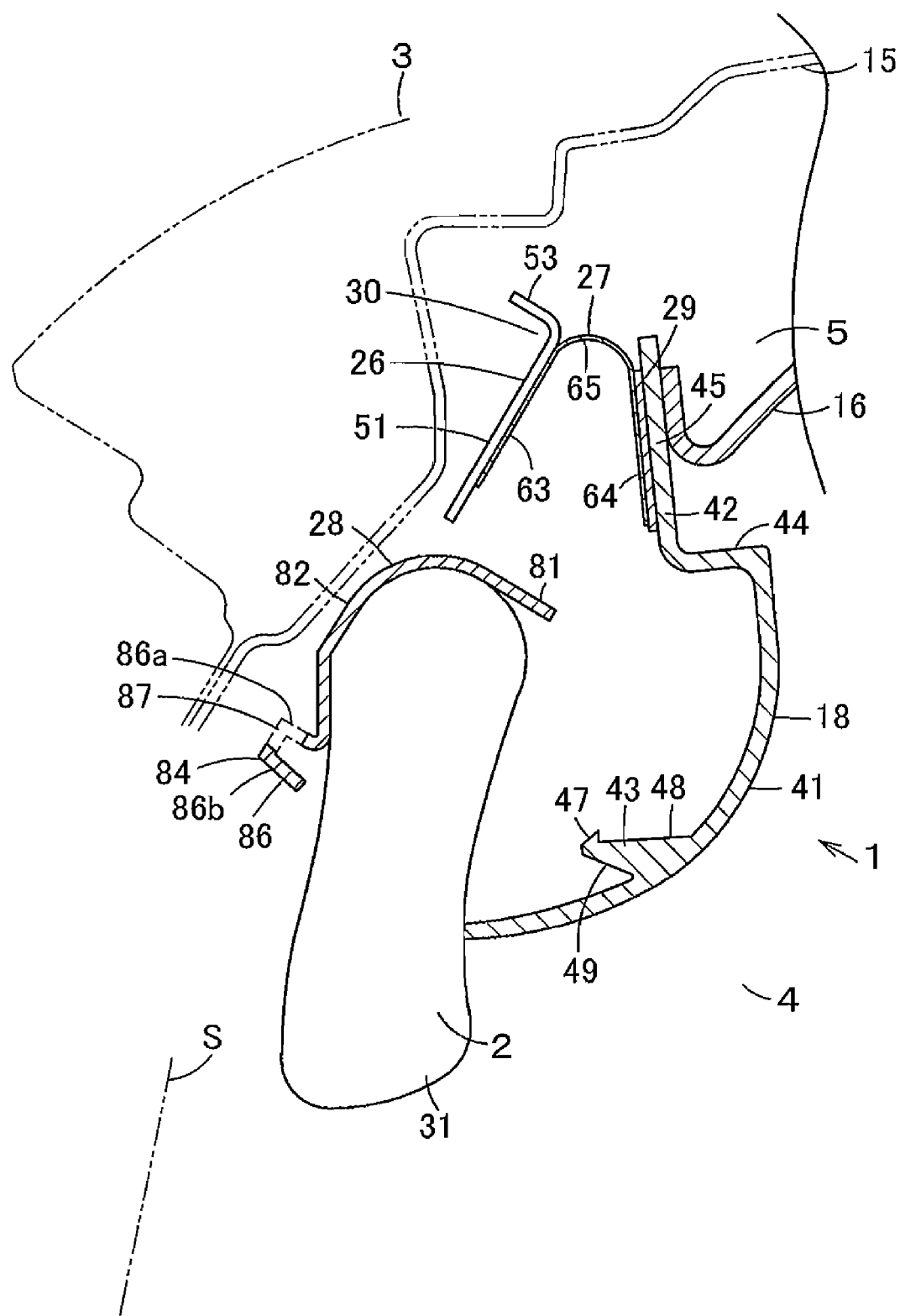
FIG. 2 is a sectional view showing the process of expansion of the airbag apparatus.
Figure 3:
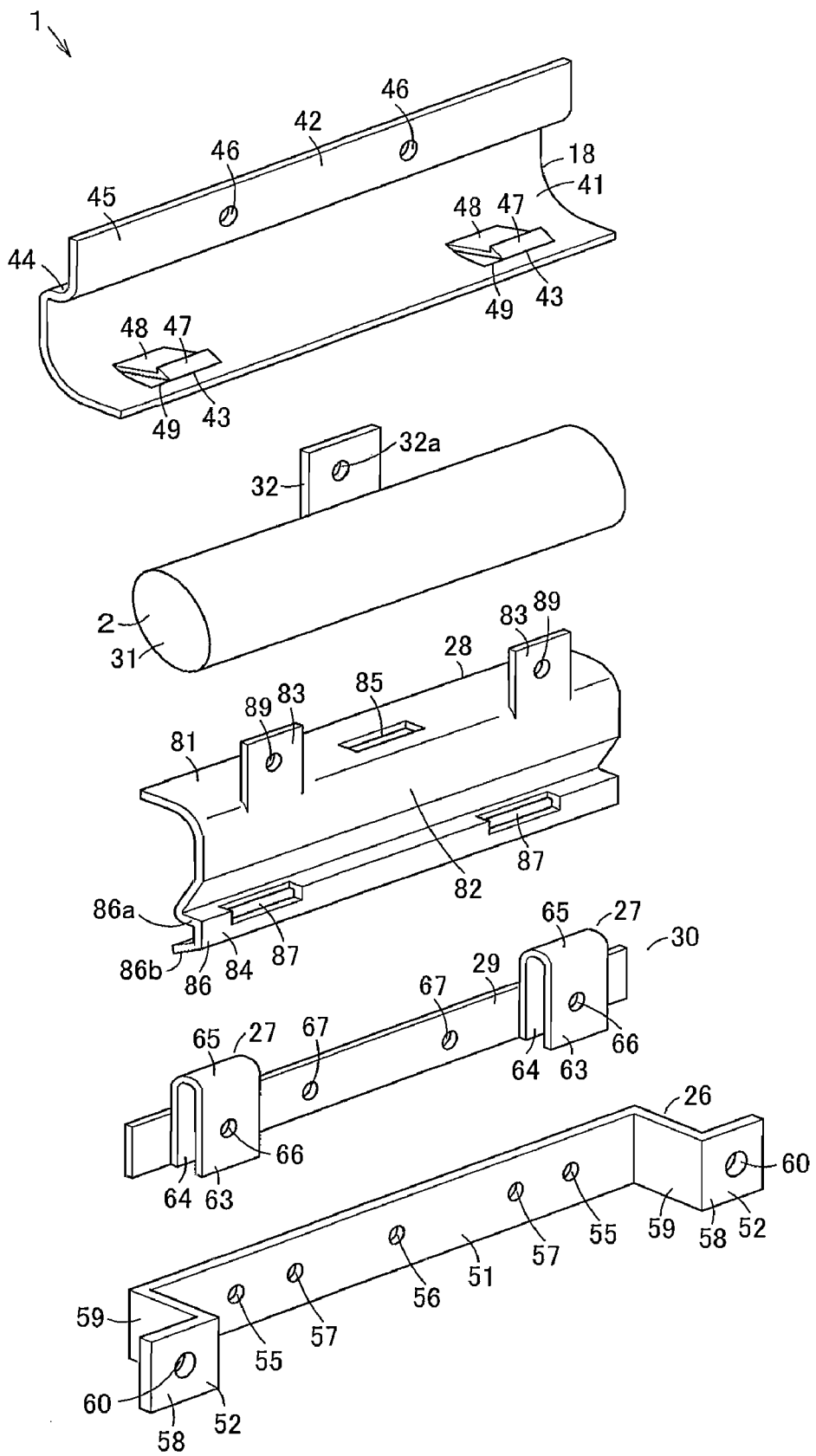
FIG. 3 is an exploded perspective view schematically showing the airbag apparatus.

In FIG. 1 or FIG. 3, reference numeral 1 denotes an airbag apparatus. The airbag apparatus 1 is equipped with an airbag 2 which is called a curtain airbag or an airbag for side collision. As shown in FIG. 1, during normal times, the airbag apparatus 1 is disposed at a roof side part 5 as a storage position of a cabin 4 in a body 3 of an automobile which is a vehicle. As shown in FIG. 2, on receiving an impact resulting from a side collision, rolling over or the like, it expands to the side of a passenger in a planar configuration, thereby protecting a passenger to be protected. It is noted that the following explanation will be made on the basis of an understanding that directions including vertical and front-back directions are based on a direction in which a vehicle advances straight, and for internal and external sides, for example, a direction toward the outside of either side of the cabin 4 is regarded as the external side.

Then, the body 3 of an automobile is provided inside the cabin 4 with front seats and back seats on which passengers can sit, and doors (not illustrated) respectively equipped with a window part are disposed corresponding to these front seats and back seats. Further, on both sides of the cabin 4, disposed are from the forward side a front pillar, which is also called an "A" pillar, a center pillar which is also called a "B" pillar, and a rear pillar, which is also called a "C" pillar. These window parts, doors and each of these pillars constitute a predetermined side face as the side part indicated by the double dotted and dashed line S in FIG. 2 on both side parts of the cabin 4. Further, a body panel 15 which is also called a roof side rail to act as a to-be-fitted side face part constituting the to-be-fitted member is disposed above these pillars, that is, at the upper edge portion which is one edge part of the window part, and a ceiling panel as a ceiling part is supported via a body panel 15. Still further, a windshield (front windshield) is disposed on the front side of both front pillars, and a rear window glass is disposed behind both the rear pillars. Then, the roof side part 5 as an accommodation position is installed at a part or a portion covering an overall length of the front pillar extending from a part of an edge on both sides of the ceiling panel to a direction substantially intersecting with the edge and at a part or a portion covering an overall length of the rear pillar, when necessary.

Further, together with a part of each pillar, a part of the body panel 15 and a part of the cabin 4 of the ceiling panel are covered with a head lining (roof lining) 16, which is a soft, that is, deformable ceiling plate or an interior garnish panel. Then, a first and a third pillar garnish, each of which is an interior trim material, are fitted to an overall length or a part of each of the pillars on the side of the cabin 4, thereby these pillars are covered. Still further, in the present embodiment, a resin-made garnish 18 as an interior trim material which is a cover body constituting an airbag apparatus 1 is provided at a part extending from the front pillar via the roof side part 5 to the rear pillar.

More specifically, the airbag apparatus 1 is such that which may be called a curtain airbag module and provided with an inflator which is a gas generator for supplying gas into an airbag 2, a single or a plurality of brackets 26 for fitting the airbag apparatus 1 to the body panel 15, a single or a plurality of hinges 27 fitted to these brackets 26, a protector 28, which is a guide body disposed along the longitudinal direction of the folded airbag 2, and a reinforcing plate 29, in addition to the airbag 2 and a garnish 18, thereby constituting as a module, and the module is disposed at the roof side part 5 along the body panel 15. Further, a supporting body 30 is constituted with the brackets 26, hinges 27 and the protector 28, and a reinforcing plate 29 which is equipped when necessary.

Then, the airbag 2, which is illustrated schematically in individual drawings, is equipped with an airbag main part 31 in which a single or a plurality of ground fabrics are combined, for example, one sheet of ground fabric is folded back or two sheets of ground fabric are overlaid and bonded to give a flat bag shape and a fitting piece part 32 projected from plural sites of the airbag main part 31. The airbag is folded into a long-thin shape according to a predetermined folding method and retains its shape by a cylindrical or corded shape retaining member (not illustrated). Then, the airbag 2 is a long airbag for front and back seats capable of protecting passengers in the front and back seats. The airbag main part 31 is provided with a bag-like inflating part which is inflated and expanded upon inflow of gas and a gas introducing port located at the upper rear edge of the airbag main part 31 or the central upper part thereof in the longitudinal direction, thereby allowing an inflating part to communicatively connect outside. Further, a plurality of fitting piece parts 32 of the airbag 2 are formed continuously in the upper edge of the airbag main part 31. Then, each of the fitting piece parts 32 is formed integrally with a ground fabric part which constitutes the airbag main part 31 and protruded like a tongue piece from the airbag main part 31. There are also provided fitting holes 32a, each of which is formed in a circular hole shape. Although not illustrated, a tether belt for connecting the airbag 2 to the vicinity of the forward end part of the front pillar is connected to the forward end part of the airbag 2.

Further, the inflator is equipped with a cylindrical main part accommodated backward or upward of a back seat and connected via a connecting tube to a gas introducing port of the airbag 2.

Then, the garnish 18, which may be called a roof side garnish or a roof side trim, is formed integrally with an elastically deformable synthetic resin to cover the folded airbag 2. It is equipped with a garnish main part 41 as a main part to be exposed inside the cabin 4, a garnish-side fitting part 42 as a fitting part integrally and communicatively connected to the upper edge which is one side of the garnish main part 41, and a single or a plurality of engaging parts 43 protruded integrally from the vicinity of the lower end part or the lower end part, which is the other side and the edge portion of the garnish main part 41, to the external side or the back side. Then, the garnish main part 41 is curved smoothly toward the outside downward, thereby covering the folded airbag 2, the body panel 15 and others so that they are not exposed inside the cabin 4. Further, the garnish-side fitting part 42 is equipped with a flat-plate-like cover first fitting piece part 44 extended from the garnish main part 41 to approximately the external side and a flat-plate-like cover second fitting piece part 45 extended from the external edge part of the cover first fitting piece part 44 to upward. Therefore, the garnish-side fitting part 42 is formed so as to have a cross section which is approximately in an L letter shape. Circular fitting holes 46 are formed at the cover second fitting piece part 45 at a predetermined interval.

Further, the engaging part 43 of the garnish 18 is protruded from the back side of the garnish main part 41 in a tongue piece shape and provided at the edge portion with a pawl part 47 protruded upward. Still further, a predetermined angle with respect to the accommodated airbag 2 or in the present embodiment, a direction approximately perpendicular to a direction in which the airbag 2 is expanded is referred to as a planar direction, and the upper side face of the engaging part 43, that is, a part facing the accommodated airbag 2 is, for example, given as a flat surface airbag receiving part 48 which is parallel with the cover first fitting piece part 44. Still further, the lower side face of the engaging part 43, that is, a part opposite the accommodated airbag 2 is given as an engagement releasing part 49 disposed at a predetermined angle with respect to a bracket 26 to be described later. Then, an engagement releasing part 49 is protruded below from the engaging part 43, thereby forming a single rib, a plate-like rib or a so-called triangular rib. A planar direction formed by the lower end part of the engagement releasing part 49 is set independently with respect to a planar direction of the airbag receiving part 48 and set, for example, so as to be inclined toward each other.

In the present embodiment, in a state that the garnish 18, that is, the airbag apparatus 1 is fitted to the body 3, the garnish-side fitting part 42 is covered with the head lining 16, the cover first fitting piece part 44 is disposed so that it is slightly inclined upward facing the external side, and slightly inclined to the internal side facing the upper side of the cover second fitting piece part 45.

Further, the bracket 26 may be called a base bracket. A plurality of these are disposed at the roof side part 5 on both sides of a vehicle, and for example, three brackets 26 identical in shape are disposed respectively on both sides of a vehicle. Then, each of the brackets 26 is made of metal and formed, for example, by subjecting an iron plate to press working. The bracket is equipped with a fitting/receiving part 51 which is a flat-plate-like bracket main part and a bracket-side fitting part 52 integrally continuing to both ends of the fitting/receiving part 51. As shown in FIG. 1 and FIG. 2, a reinforcing plate part 53 for reinforcement is formed in a folding manner from the upper end part of the fitting/receiving part 51 to the inside of a vehicle. Then, as shown in FIG. 3, in the fitting/receiving part 51, formed are a single or a plurality of protector fitting parts 55 formed in a circular-hole shape, a single or a plurality of airbag fitting parts 56 formed in a circular-hole shape, and a single or a plurality of hinge fitting parts 57 also formed in a circular hole shape. The bracket-side fitting part 52 is equipped with a flat-plate-like fixing part 58 and a bracket-side connecting part 59 integrally connecting the fixing part 58 with the fitting/receiving part 51. Then, a circular-hole fixing hole 60 is formed at each of the fixing part 58. Each of the brackets 26 is relatively great in rigidity and formed so as not to be deformed on expansion of the airbag 2.

Then, a single or a plurality of the hinges 27 are used, and in the present embodiment, two hinges 27 identical in shape are used in each of the bracket 26. Further, the hinges 27 are made of resin or metal, and in the present embodiment, they are made of metal and formed integrally, for example, an iron plate which is plastic deformable is subjected to press working to form a U letter shape in its cross section, and also integrally connected by being fixed to a reinforcing plate 29. Then, each of the hinges 27 is provided with a plate-like first fitting part 63, a plate-like second fitting part 64 facing the first fitting part 63, and a curved hinge part 65 connecting the first fitting part 63 with the base end of the second fitting part 64 in a deformable manner. Then, the first fitting part 63 is disposed by being overlaid on the internal side face of the fitting/receiving part 51 of the bracket 26, positioned with respect to the hinge fitting part 57, thereby forming a circular-hole first fitting hole 66. Then, a fixture such as a screw or a rivet (not illustrated) is to be inserted into the first fitting hole 66. Further, the second fitting part 64 is fixed to the external side face of the reinforcing plate 29 by welding or the like, and connected to the garnish-side fitting part 42 of the garnish 18 via the reinforcing plate 29.

Further, the reinforcing plate 29 is made of resin or metal. In the present embodiment, it is made of metal and formed integrally in a narrow rectangular flat plate. Then, the reinforcing plate 29 is formed in a shape along the cover second fitting piece part 45 of the garnish-side fitting part 42 of the garnish 18 and disposed along the external side face of the cover second fitting piece part 45. Then, the hinge 27 is fixed to the reinforcing plate 29 as described above, and a single or a plurality of circular-hole garnish fitting parts 67 are formed thereon. Then, a fixture such as a screw or a rivet (not illustrated) is to be inserted into the garnish fitting part 67.

Still further, the protector 28 may be called a cover for preventing an airbag from being damaged and made integrally of a synthetic resin to form approximately an L letter shape in its cross section so as to run along a part or approximately an overall length of the folded airbag 2. In other words, the protector 28 is constituted in an integrated manner with a protector base plate part 81 which is formed in a long flat-plate shape, a protector side plate part 82 as a guide part protruded by being bent downward from the external edge part of the protector base plate part 81, a plurality of protector-side fitting parts 83 protruded upward from the external edge of the protector base plate part 81, and an engagement receiving part 84 along the edge portion of the protector side plate part 82, that is, the lower edge part. Then, the protector base plate part 81 is provided at a part along the upper side of the folded airbag 2 with a grooved fitting-piece inserting part 85 along the longitudinal direction in which the fitting piece part 32 of the airbag 2 is inserted. Further, the protector side plate part 82 is a part along the external side of the folded airbag 2 and curbed or bent according to a shape of the accommodated airbag 2. Still further, the engagement receiving part 84 is equipped with a base part 86 constituting a concave groove which opens to the internal side, the cross section of which is formed approximately in a U letter shape with corners, and a single or a plurality of engaging holes 87 formed at the base part 86. Then, a single or a plurality of the engaging hole 87 are formed by being positioned with respect to the engaging part 43 of the garnish 18 so that they are located at the upper side of the base part 86 or they penetrate through the upper corner thereof in the present embodiment. Further, an upper piece 86*a* and a lower piece 86*b* constituting the base part 86 formed approximately in a U letter with shape with corners may be formed so as to be parallel to each other. However, in the present embodiment, the edge portion of the lower piece 86*b* is inclined downward, that is, the base part 86 is formed so that the concave groove is opened. Still further, the protector side fitting part 83 is protruded perpendicularly upward substantially along the protector side plate part 82, and provided with a circular-hole fitting hole 89. A corner at which the protector base plate part 81 and the protector side plate part 82 are in continuation is formed in a smooth curved surface so as to run along the folded airbag 2 excluding a site at which the protector side fitting part 83 is formed.

Next, a description is given for motions of assembling the airbag apparatus 1 and those of fitting the airbag apparatus 1 to a vehicle.

First, the hinge 27 is connected to the reinforcing plate 29 by welding or the like. Then, the hinge 27 is fitted to the bracket 26. This work is conducted according to procedures in which a first fitting part 63 of the hinge 27 is overlaid on a fitting/receiving part 51 of the bracket 26 and a fixture inserted into the hinge fitting part 57 of the fitting/receiving part 51 from the external side is fixed to the first fitting hole 66 of each hinge 27.

Then, the airbag 2 folded into a predetermined shape and the protector 28 are fitted to the bracket 26. This work is conducted according to procedures in which the airbag 2 is placed along the internal side and also the lower side of the protector 28, thereby each fitting piece part 32 of the airbag 2 is drawn out upward from the fitting piece inserting part 85, the protector side fitting part 83 of the protector 28 and each fitting piece part 32 are placed along the external side or the internal side of the fitting/receiving part 51 of the bracket 26. Then, a fixture such as a rivet is inserted into the protector fitting part 55 of the bracket 26 and the airbag fitting part 56, and also inserted into the fitting hole 32*a* of the airbag 2 and the fitting hole 89 of the protector 28, which are then fixed by crimping or the like.

Further, the garnish 18 is fitted to the reinforcing plate 29, in other words, the garnish 18 is fitted to the bracket 26 via the reinforcing plate 29 and the hinge 27. This work is conducted according to procedures in which the garnish 18 is assembled to other members in such a manner that the airbag 2 is covered with the garnish main part 41, the cover second fitting piece part 45 of the garnish side fitting part 42 is placed along the internal side face of the reinforcing plate 29 and a fixture such as a rivet is inserted into the fitting hole 46, and also inserted into the garnish fitting part 67, which are then fixed by clamping or the like.

Still further, when the garnish main part 41 of the garnish 18 is pressed to the external side, an engaging part 43 protruded outside the garnish main part 41 is pressed into a base part 86 of the engagement receiving part 84, the cross section of which is formed approximately in a U letter shape, while the engagement receiving part 84 of the protector 28 is elastically deformed. Further, a pawl part 47 disposed at the edge portion of the engaging part 43 is engaged with the engaging hole 87 of the engagement receiving part 84 and prevented from being disengaged. Then, the engaging part 43 is engaged with the engagement receiving part 84, by which the garnish main part 41 of the garnish 18 is supported at the lower part thereof by the protector 28 connected to the bracket 26.

Therefore, as shown in FIG. 1, the airbag apparatus 1 is constituted, which is a module in which the airbag 2, the garnish 18, the protector 28, the hinge 27 and the reinforcing plate 29 are fitted to the bracket 26, that is, a sub-assembled curtain airbag module. In a state of a module, the airbag apparatus can be stored, transported and assembled to the vehicle body 3.

Then, when the airbag apparatus 1, which has been made into a module, is fitted to the vehicle body 3, the bracket 26 is fixed to the body panel 15 by inserting a fixture such as a screw or a rivet (not illustrated) into the fixing hole 60 for fixing to the body. Before or after assembling work of the bracket 26 or the module, a connecting tube of an inflator is also connected to the airbag 2, and the inflator is electrically connected to a controller installed on the vehicle body 3, thereby the airbag apparatus 1 is completely assembled to the vehicle body 3.

Then, in a state that the airbag apparatus 1 and the head lining 16 are fitted to the vehicle body 3, the garnish side fitting part 42 of the garnish 18 is covered with the head lining 16 and therefore not exposed to the cabin 4, and the side face of the head lining 16 continues to the side face of the garnish main part 41 so as to be substantially flush with each other.

Further, in a state that the airbag apparatus 1 is constituted as described above, the garnish 18 is supported in such a manner that the garnish side fitting part 42 disposed at an upper part of the garnish main part 41 is supported by the bracket 26 via the reinforcing plate 29 and the hinge 27. And also the engaging part 43 protruded from a lower side of the garnish main part 41 is supported by the bracket 26 via the protector 28, in other words, the garnish 18 is stably supported by the bracket 26 below and above the airbag 2. Therefore, if the garnish 18 is thermally deformed, the garnish 18 is prevented from being slackened or the airbag 2 is prevented from being exposed outside.

Next, a description is given for motions on expansion of the airbag 2.

On a side collision or rolling over of a vehicle, an inflator is actuated by a controller, by which gas ejected from the inflator is introduced into an inflating part inside the airbag main part 31 from the gas introducing port via a connecting tube. Then, the inflating part of the airbag main part 31 is inflated and expanded from a state shown in FIG. 1 to a state shown in FIG. 2, while pressing the garnish 18. It is instantly inflated and expanded in a curtain-shape in a predetermined direction along a predetermined side face or approximately downward, covering window parts, the center pillar and others, lessening the impact of a passenger with the center pillar or the like, and protecting the passenger from being thrown out from a vehicle.

Further, in an initial stage of inflation and expansion of the airbag 2, the airbag 2 to be inflated and expanded is brought into contact with the airbag receiving part 48 of the engaging part 43 of the garnish 18, thereby pressing the engaging part 43 to a direction in which a force of rotating the garnish 18 below is more likely to be transmitted. Then, the engagement releasing part 49 on the lower side face of the engaging part 43 presses a strip 86*b* below the engagement receiving part 84, allowing the base part 86 of the engagement receiving part 84, the cross section of which is formed approximately in a U letter shape, to deform so as to spread out. And, at the same time, the garnish main part 41 moves rotationally, thereby the pawl part 47 is disengaged from an engaging hole 87.

Then, in the airbag 2, the resin-made garnish 18 is elastically deformed and the hinge 27 is plastically deformed in a direction in which the U letter shape is opened, thereby allowing the garnish 18 to move rotationally in a direction in which the garnish 18 is opened, absorbing a great impact in an initial stage of expansion of the airbag 2, smoothly forming an ejection port of the airbag 2, thus making it possible to allow the airbag 2 to smoothly expand.

As described above, according to the present embodiment, in the airbag apparatus 1 which is a curtain airbag apparatus disposed at the roof side part 5, on expansion of the airbag 2, the airbag 2 presses the garnish 18, by which the resin-made garnish 18 is elastically deformed and the hinge 27 is deformed, to allow the garnish 18 to move, forming an ejection port of the airbag 2, thus making it possible to expand the airbag 2 smoothly.

Then, with respect to the garnish 18, during normal times when the airbag 2 is folded into a long-thin shape, the garnish-side fitting part 42 disposed at an upper part of the garnish main part 41 is supported by the bracket 26 via the reinforcing plate 29 and the hinge 27, the engaging part 43 protruded from below the garnish main part 41 is supported by the bracket 26 via the protector 28, and the garnish 18 is securely fixed at the lower part thereof. Therefore, if the garnish 18 is softened and deformed thermally, the garnish 18, which is formed long, is prevented from being slackened or the airbag 2 is prevented from being exposed outside, and the garnish 18 is able to cover the airbag 2 stably keeping a good appearance of the airbag 2.

Further, the airbag apparatus 1 includes not only the airbag 2, the hinge 27 and the bracket 26 but also the garnish 18 having the engaging part 43 and the protector 28 having the engagement receiving part 84, assembled in an integrated manner and made into a module. Therefore, the airbag apparatus 1 is able to support the long garnish 18 stably without slackening and protect members such as the garnish 18 not only after the airbag apparatus 1 is fitted to the vehicle body 3 but also during storage, transport and assembly work before the airbag apparatus 1 is fitted to the vehicle body 3. Still further, the number of components to be fitted to the vehicle body 3 is reduced to perform the assembly work easily, thus making it possible to decrease the costs of fitting the airbag apparatus 1 to the vehicle body 3. In other words, according to the present embodiment, the airbag apparatus 1 which is a curtain airbag equipped with the long airbag 2 folded into a long-thin shape is high in work efficiency, easy in fitting work by improving the assembly work to a vehicle and able to decrease the working time needed for work carried out above the shoulders, thereby lessening the burden on a worker, although the work carried out above the shoulders is required.

Then, on expansion of the airbag 2, the airbag 2 presses the garnish 18, by which the engaging part 43 is disengaged from the engagement receiving part 84, allowing for movement of the garnish 18, thus making it possible to expand the airbag 2 smoothly.

Particularly, in the present embodiment, above the engaging part 43 of the garnish 18, equipped is a planar airbag receiving part 48 moving in a direction in which it is effectively pressed by the airbag 2 on inflation and expansion of the airbag 2. Further, below the engaging part 43, provided is an engagement releasing part 49 moving in a direction in which the engagement receiving part 84 of the bracket 26 is effectively pressed. Therefore, the engaging part 43 is able to reliably receive a force by which the airbag 2 is inflated and expanded and also transmit force to the engagement receiving part 84. Thus, such a constitution can be achieved that during normal times, the engaging part 43 is stably engaged and retained by the engagement receiving part 84, and only on inflation and expansion of the airbag 2, the engaging part 43 is disengaged from the engagement receiving part 84 smoothly and instantly.

Further, the engagement releasing part 49 of the engaging part 43 of the garnish 18 is formed as a so-called triangle rib connecting the engaging part 43 with the garnish main part 41 thereby increasing the rigidity of the engaging part 43 for reinforcement.

Still further, since the airbag apparatus 1 is equipped with the protector base plate part 81 disposed along the longitudinal direction of the folded airbag 2 and the protector 28 equipped with the protector side plate part 82, it is possible that on accommodation and expansion of the airbag 2, the airbag 2 is prevented from interfering with members of the vehicle body 3 such as the body panel 15 to protect the airbag 2, and also during the course of expansion, the airbag 2 is guided to a direction in which it is expanded. Further, since the engagement receiving part 84 is formed along the edge portion of the protector side plate part 82 of the protector 28, it is possible to simplify the constitution and reduce the costs of producing the airbag apparatus 1.

In addition, since the hinge 27 is equipped which connects the bracket 26 with the garnish 18 and is deformed on inflation and expansion of the airbag 2, it is possible that on expansion of the airbag 2, the airbag 2 presses the garnish 18, by which the hinge 27 is deformed and allows for movement of the garnish 18, thus making it possible to allow the airbag 2 to expand smoothly.

As described above, with the curtain airbag which is equipped with the long airbag 2 folded in a long-thin shape and covered with the garnish 18 or an interior trim material, the production cost can be reduced and expansion characteristics can be easily improved.

Further, since the garnish 18 can be stably supported, the garnish 18 and the hinge 27 are respectively formed of resin (soft material) in an integrated manner, thereby easily attaining a reduction in production costs and making these components lighter in weight, as compared with a case that they are made of metal. Still further, since the garnish 18 is formed of resin, an appearance suitable as an interior trim material and characteristics such as impact absorption can easily be achieved, as compared with a case where it is made of an iron plate.

Figure 4:
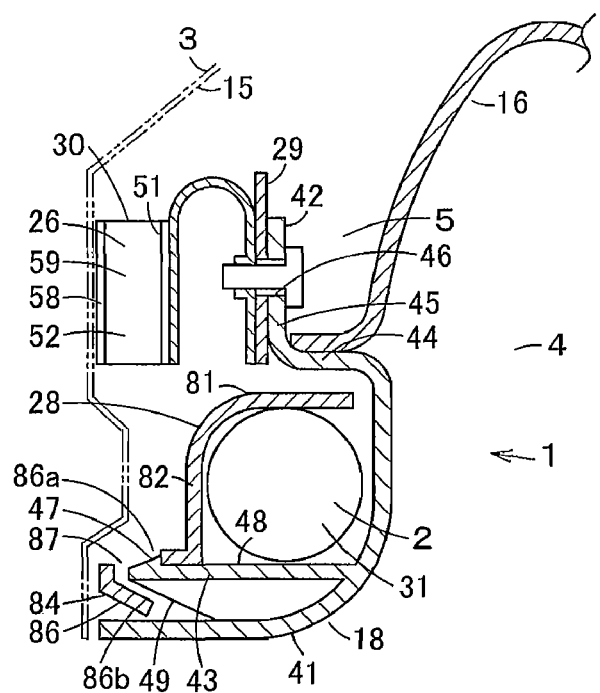
FIG. 4 is a sectional view showing another embodiment of the airbag apparatus of the present invention.
Figure 5:
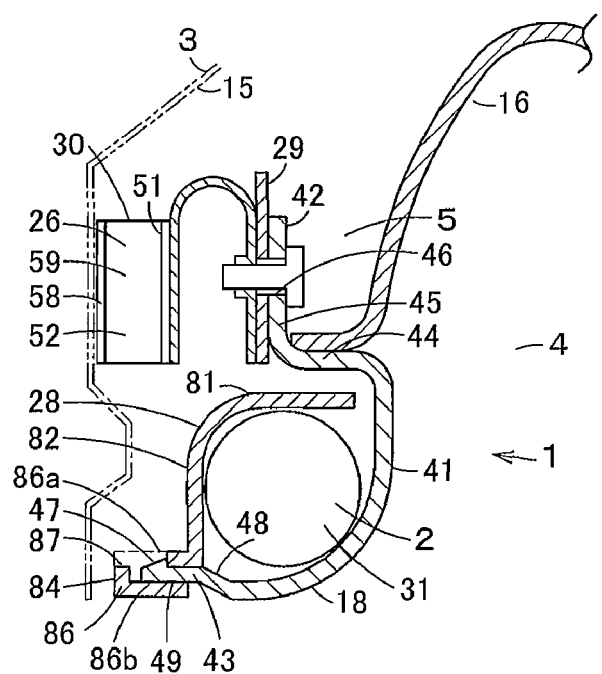
FIG. 5 is a sectional view showing still another embodiment of the airbag apparatus of the present invention.

In the above embodiment, the shapes of the airbag 2, the garnish 18, the hinge 27, the bracket 26 having the engaging part 43, the protector 28 having the engagement receiving part 84, and the reinforcing plate 29 shall not be limited to the above constitution. For example, as shown in FIG. 4, the engaging part 43 may be greatly protruded from the outer side face of the garnish main part 41 to the external side and faced to a whole part below the airbag folded and accommodated. Further, as shown in FIG. 5, the engaging part 43 may be protruded so as to extend from the lower end part which is the edge portion of the garnish main part 41, that is, the lower end part which is the edge portion of the garnish 18 toward the outside. In FIG. 4 and FIG. 5, components having the same functions as those shown in FIG. 1 or FIG. 3 are given the same numerals or symbols, a description of which is omitted here.

Further, in the above embodiment, the engaging hole 87 of the engagement receiving part 84 of the protector 28 is formed as a through hole but shall not be limited to the above constitution. For example, it may be formed as a recess into which the pawl part 47 is inserted.

Further, the hinge 27 may be formed integrally with the reinforcing plate 29 or may be formed integrally with the bracket 26, thereby decreasing the number of components to reduce the production cost.

Further, the fitting piece part 32 of the airbag 2 may be fitted along the internal side face of the fitting/receiving part 51 of the bracket 26 by winding the fitting piece part 32 around the fitting/receiving part 51, in addition to a case where it is fitted along the external side face of the fitting/receiving part 51 of the bracket 26.

Still further, the garnish 18 may be formed by being divided along the longitudinal direction and, in addition to a case where it is formed integrally all over the length of the airbag 2.

In addition, the airbag 2 shall not be limited to a constitution in which an airbag is expanded from above to below, to cover the window parts on the side of an automobile, but may be applicable to any airbag apparatus in which it is inflated and expanded in a planar manner or like a curtain along a predetermined side face.

In terms of the industrial applicability, the present invention is applicable, for example, to an airbag apparatus or a so-called curtain airbag apparatus which is expanded along window parts on the side of an automobile.

What is claimed is:

1. An airbag apparatus comprising:
    an airbag which is inflated and expanded from a state of being folded into a long-thin shape upon introduction of gas;
    a supporting body fitted to a to-be-fitted member;
    a cover body comprising:
        a main part covering the airbag in a folded state along a longitudinal direction,
        a fitting part disposed on one side of the main part along the longitudinal direction and supported by the supporting body, and
        an engaging part disposed on the other side of the main part along the longitudinal direction;
    an engagement receiving part disposed on the supporting body, engaged with the engaging part in a disengageable manner, supporting the main part via the engaging part at folded state of the airbag, and releasing the engagement of the engaging part on expansion of the airbag, thereby allowing for movement of the main part; and
    a hinge provided on the supporting body and separate from the cover body supporting the fitting part, wherein the hinge is plastically deformable on expansion of the airbag.

2. The airbag apparatus according to claim 1, wherein the supporting body is equipped with a bracket fitted to the to-be-fitted member, a protector equipped with a guide part fitted to the bracket and disposed along the longitudinal direction of the airbag in a folded state and the engagement receiving part.

3. The airbag apparatus according to claim 1, wherein the engaging part is equipped with an airbag receiving part pressed by the airbag on inflation and expansion of the airbag.

4. The airbag apparatus according to claim 1, wherein the cover body is an interior trim material of a vehicle, the bracket is located on the side part of a cabin of a vehicle and fixed to the vehicle body, and the airbag is expanded along the side part of the cabin.

5. The airbag apparatus according to claim 1, wherein the hinge is "U" shaped.

6. The airbag apparatus according to claim 1, wherein the cover body is elastically deformable.

* * * * *